July 28, 1959 ARVID STRAUSS 2,896,352
NOW BY CHANGE OF NAME ARVID MARLO
ARTIFICIAL ARTICLES IMITATING NATURAL ARTICLES
Filed April 14, 1958

INVENTOR:
ARVID STRAUSS
BY
Marshall, Johnston, Cook & Root
ATT'YS

United States Patent Office 2,896,352
Patented July 28, 1959

2,896,352

ARTIFICIAL ARTICLES IMITATING NATURAL ARTICLES

Arvid Strauss, Chicago, Ill., now by change of name Arvid Marlo

Application April 14, 1958, Serial No. 728,338

8 Claims. (Cl. 41—10)

This invention relates to artificial plants in general, and particularly to artificial fruits, flowers, and other imitations of natural objects for ornamental and decorative purposes, and to the method of producing such artificial objects.

The primary object of the present invention is to produce hollow imitations of natural objects, such as fruits, flowers, cacti, and the like, which closely resemble natural articles so as to be practically visually indistinguishable therefrom.

Another object of the invention is to produce new and novel articles made of plastic and which have a very natural appearance practically indistinguishable from the natural product.

A further object of the invention consists in the particular manner in making certain parts of the articles or products of one kind of material and another part thereof of another kind of material.

A still further object consists in new and novel means to detachably connect the branches of the articles to the articles.

Numerous other objects and advantages will be apparent throughout the progress of the specification which follows.

The invention is shown as being applicable to grapes, but it is, of course, understood that it is equally applicable to cherries, berries, apples, peaches, and other kinds of fruits, as well as flowers, spines of cacti, and other articles.

The accompanying drawing illustrates a certain particular selected embodiment of the invention, and the views therein are as follows:

Fig. 3 is a detail transverse sectional view of a certain type of mold which may be used in connection with forming hollow objects such as grapes, cherries, apples, and the like;

Fig. 6 is a detail diagrammatic view of a rotary type mold for molding the stem and branches; and Fig. 7 is a view at right angles to Fig. 6.

Figure 1:
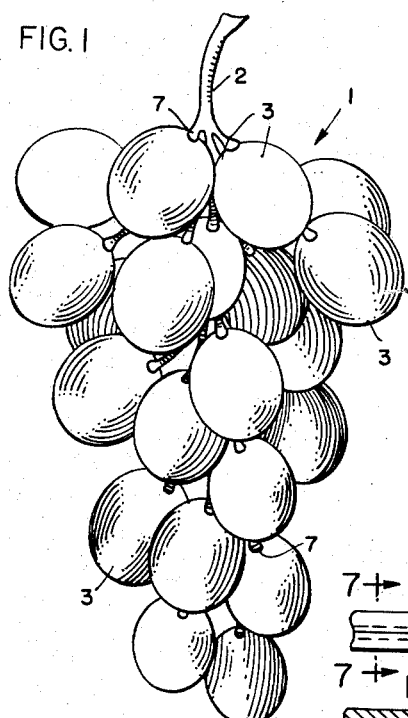
Fig. 1 is a pictorial view as applied to a bunch of grapes, and embodying the invention.

The particular artificial object herein shown for illustrating the invention comprises a bunch of grapes 1, Fig. 1, having a stem 2 to which individual grapes 3 may be easily applied, but which may be detached therefrom should there be any particular purpose for such detachment.

In practicing the invention, it has been found desirable that the grapes be made of a thermoplastic such as vinyl resin to render the grape, or other object, soft, smooth and flexible, and to give a natural life-like appearance thereto. The individual grapes 3 may be formed preferably by a rotational molding process, only a section 4 of the lower mold, Fig. 3, being shown. The mold 4 has a pin-like member 5 secured thereto, preferably being threaded to the mold and capable of being removable. The pin 5 may have a threaded stem 6, Fig. 3, which is threaded into the bottom of the mold 4, preferably at the center of each mold cavity, only one such cavity being shown.

The stem 2 is preferably molded in a flat plane from polyethylene or other suitable thermoplastic material by an injection molding process. The stem 2 and its attached branches 7 are rendered natural looking and, being relatively round in cross section, are relatively flexible so that the various branches 7 thereof will be turned or twisted naturally and automatically by the application of the grapes to the branches, the turning or twisting movement or arrangement of the branches taking place solely by the application of articles. Therefore, when the grapes 3 are secured to the branches 7 of the stem, the grapes will assume a natural bunch-like formation, as shown in Fig. 1.

Figure 4:
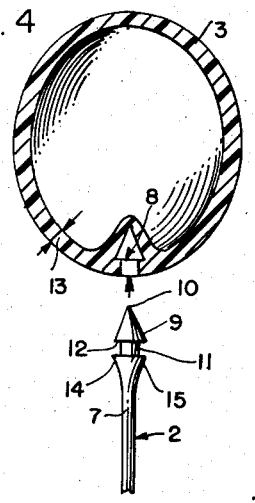
Fig. 4 is an enlarged detail exploded view showing a grape after the same has been removed from the mold or casting, and a part of the branch which has interlocking engagement with a grape.

The pin 5 is of such a formation, contour and construction that the same may be easily and quickly removed from the mold without any damage occurring to the grape, or other object, leaving a receiving opening, recess or socket 8 at the bottom thereof, as shown more particularly in Fig. 4.

Figure 2:
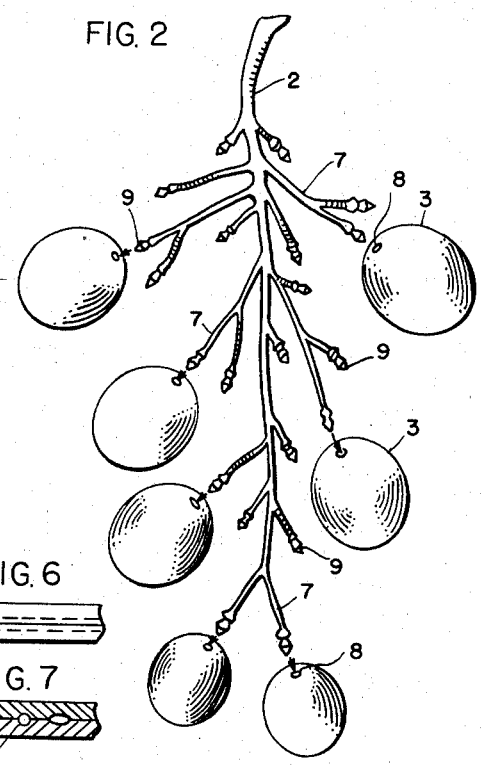
Fig. 2 is a detail view showing the stem formation of a bunch of grapes, and the manner in which individual grapes may be applied to the branches.
Figure 5:
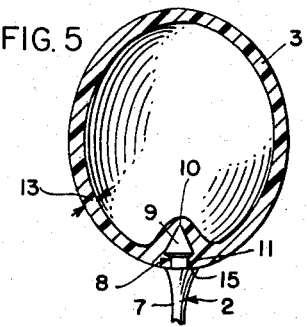
Fig. 5 is an enlarged deatil sectional view showing a completed grape having the branch attached or applied thereto.

The stem 2 and its branches 7, which are formed by injection molding polyethylene resin or other suitable plastic, are provided with an integral securing end button or knob 9, preferably pointed at 10, Figs. 2, 4, and 5, to permit easy and quick insertion of the end of a branch 7 into the opening or socket 8 in the grape body, there being a part of the stem branch of a particular diameter so as to form an undercut recess 11 beneath the enlarged end 12 of the member 9. The member 9 is preferably the same size as the recess 8 and is receivable in the recess. That part of the branch 7 which lies immediately below the undercut is outwardly flaring, or relatively bell-shaped, as indicated at 14, and has a relatively curved contour, as indicated at 15, to conform with the curve or roundness of the grape body. Any particular formation or contour of the end 14 of the branch 7 for engagement with the grape 3, or other element, may be employed just so as to sucecssfully carry out the advantages of the invention.

The ends of the branches 7 are shown particularly as having the part 9 tapered or conical, the end 14, below the reduced section 11, curving, as at 15, so that the bottom of the member 9, the upper edge of the branch 7 at 15, and the flaring or bell-shaped formation 14 will fit smoothly and snugly against the outside of the grape and will assume the normal arcuate configuration of the grape.

It is to be understood that while a bunch of grapes is described, other products as above mentioned may be made in an identical or similar manner, just so that a part of the branch 7 will engage the article so as to simulate the natural article, and at the same time permit easy insertion of the end 9 of the branch 7 into interfitting engagement with the article. However, the formation of the end of the branches 7 by the use of a conical end 9, as shown in Fig. 4, appears to be the most desirable and practical at the present time. Any other suitable interlocking engagement, capable of performing the function indicated, may be used or substituted.

The invention provides for the manufacture of an imitation of a natural decorative object such as fruit, flowers, or the like, which so closely resembles the natural article as to be practically visually indistinguishable therefrom.

The grapes 3 themselves, or the other articles made in accordance with the teachings of this invention, are relatively soft and flexible and can be colored easily and quickly so as to give a very natural appearance and be practically indistinguishable from the natural object. Also, it is believed that one of the reasons for the natural appearance of the product is that the article itself is cast from vinyl resin, while the stem is cast by an injection molding process from polyethylene.

The use of the materials herein described reproduces a natural coloring by the inclusion of coloring material within the vinyl material, as well as coloring the stem to also imitate the natural object. While vinyl and polyethylene are specifically referred to as being preferable, other resins, thermoplastics, nylon, and other material capable of producing the desired results, may be used.

Figures 3, 6, 7:
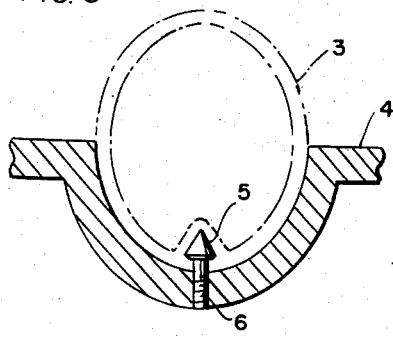

The injection molding of the stem and its branches is performed in a horizontal plane, the mold, Figs. 6 and 7, being etched or cut to form the stem and branches 2 and 7.

The pins 5 may be easily and quickly applied to, or removed from, the mold 4, and the conical members 5 cooperating in the sockets 8 permit for quick and easy attachment of the branch to the product.

Changes may be made in the form, construction and arrangement of the parts and the process may be changed within certain limits without departing from the spirit of the invention or sacrificing any of its advantages, and the right is hereby reserved to make all such changes as fall fairly within the scope of the following claims.

The invention is hereby claimed as follows:

1. An imitation of a bunch of grapes comprising a plurality of closed hollow bodies of plastic simulating grapes and a plastic stem, each body having a socket at one end thereof, said stem having a plurality of branches, each branch having a button on the end thereof adapted to be detachably received in a socket of a hollow body.

2. A bunch of artificial grapes comprising a solid stem cast from polyethylene and having a plurality of integral branches, a plurality of hollow grapes formed of vinyl resin, each grape having a socket in a wall thereof, and a projection on a branch interfitting with an opening in a grape to interlock the stem to the grapes.

3. An imitation of a bunch of grapes comprising a plurality of closed hollow bodies of plastic simulating grapes and a plastic stem, each body having a socket at one end thereof, said socket being formed inwardly of the outer surface of the body, said stem having a plurality of branches, each branch having a button on the end thereof adapted to be detachably received in a socket of a hollow body.

4. An imitation of a bunch of grapes comprising a plurality of closed hollow bodies of vinyl resin simulating grapes and a stem of polyethylene, each body having a socket in one end thereof, said stem having a plurality of branches, each branch having a button on the end thereof adapted to be detachably received in a socket of a hollow body.

5. A bunch of artificial grapes comprising a stem of thermoplastic material having a plurality of randomly arranged branches of various lengths integral therewith and molded in a flat plane and a plurality of grapes, each branch having a button on its terminal end, each grape having a hollow body of thermoplastic material and a socket in the wall of the body for detachably receiving a button of a branch to be carried by the stem, whereby when the grapes are attached to the branches, the branches will automatically reposition upon the contact among the adjacent grapes to assume a natural position.

6. An imitation of a natural fruit comprising a stem of thermoplastic material and a fruit, said stem terminating at one end in a flared portion, a reduced section extending outwardly from the flared portion, and a conically shaped button connected at its large end to the outer end of the reduced section, said fruit having a hollow body of thermoplastic material and a socket in the wall of the body, said socket including a conically shaped recess complementally sized to intimately receive the conically shaped button and a reduced recess opening to the outer surface of the body sized to intimately receive the reduced section on the stem so that the flared portion abuts against the outer surface of the body around the opening to the reduced recess to firmly connect the fruit to the stem.

7. A bunch of artificial fruit, comprising a stem of thermoplastic material having a plurality of randomly arranged branches of various lengths integral therewith and a plurality of fruits attached to said branches, each branch terminating in a flared portion, a reduced section extending outwardly from the flared portion, and a conically shaped button connected at its large end to the outer end of the reduced section, each fruit having a hollow body of thermoplastic material and a socket in the wall of the body, said socket including a conically shaped recess complementally sized to intimately receive the conically shaped button and a reduced recess opening to the outer surface of the body sized to intimately receive the reduced section on the branch so that the flared portion abuts against the outer surface of the body around the opening to the reduced recess to firmly connect the fruits to said branches.

8. A bunch of artificial grapes comprising a stem of thermoplastic material having a plurality of randomly arranged branches of various lengths integral therewith and a plurality of grapes, each branch terminating in a flared portion, a reduced section extending outwardly from the flared portion, and a conically shaped button connected at its large end to the outer end of the reduced section, each grape having a hollow body of thermoplastic material and a socket in the wall of the body, said socket including a conically shaped recess complementally sized to intimately receive the conically shaped button and a reduced recess opening to the outer surface of the body sized to intimately receive the reduced section on the branch so that the flared portion abuts against the outer surface of the body around the opening to the reduced recess to firmly connect the grapes to the branches, said branches being arranged and sized to position the grapes so as to simulate a natural bunch of grapes.

References Cited in the file of this patent

UNITED STATES PATENTS

| Re. 15,641 | Emery | July 3, 1923 |
| 1,738,613 | Rice | Dec. 10, 1929 |
| 2,054,605 | Rogers | Sept. 15, 1936 |
| 2,651,810 | Snyder | Sept. 15, 1953 |
| 2,714,269 | Charles | Aug. 2, 1955 |